(12) United States Patent
Weise et al.

(10) Patent No.: US 6,453,747 B1
(45) Date of Patent: Sep. 24, 2002

(54) HERMETIC PRESSURE TRANSDUCER

(76) Inventors: Peter A. Weise, 59 Samuel Way, Attleboro, MA (US) 02703; Chris D. Wagner, 31 Beachwood Ave., Pawtucket, RI (US) 02860; Thomas R. Maher, 25 Maple La., Rehoboth, MA (US) 02769

( * ) Notice: Subject to any disclaimer, the term of this patent is extended or adjusted under 35 U.S.C. 154(b) by 23 days.

(21) Appl. No.: 09/723,139

(22) Filed: Nov. 27, 2000

Related U.S. Application Data

(60) Provisional application No. 60/175,803, filed on Jan. 12, 2000.

(51) Int. Cl.$^7$ ................................................. G01L 9/12

(52) U.S. Cl. ........................... 73/715; 73/718; 73/717; 73/716; 73/720; 73/726

(58) Field of Search .................... 73/715, 714, 720, 73/726, 756, 718; 29/832, 829, 840, 846

(56) References Cited

U.S. PATENT DOCUMENTS

| | | | | |
|---|---|---|---|---|
| 4,875,135 A | * | 10/1989 | Bishop et al. ................ | 73/718 |
| 6,009,757 A | * | 1/2000 | LeComte et al. ............. | 73/724 |
| 6,223,603 B1 | * | 5/2001 | McKinnon .................... | 73/718 |
| 6,272,927 B1 | * | 8/2001 | Amatruda et al. ............ | 73/718 |
| 6,289,732 B1 | * | 9/2001 | Murari et al. ................ | 73/439 |
| 6,316,734 B1 | * | 11/2001 | Yang .......................... | 174/256 |
| 6,326,682 B1 | * | 12/2001 | Kurtz et al. ................. | 257/678 |
| 6,330,829 B1 | * | 12/2001 | Kurtz et al. ................. | 73/715 |

FOREIGN PATENT DOCUMENTS

| JP | 09-218117 | * | 8/1997 |
|---|---|---|---|

\* cited by examiner

*Primary Examiner*—Benjamin R. Fuller
*Assistant Examiner*—Andre Allen
(74) *Attorney, Agent, or Firm*—Russell E. Baumann; Frederick J. Telecky, Jr.

(57) ABSTRACT

A port fitting (12, 42) is formed with a closed, pedestal end forming a diaphragm (12a, 42b) on which a strain gauge sensor (22) is mounted. A support member (16, 44) is received on the pedestal end and is formed with a flat end wall (16a, 44a) having an aperture (16c, 44c) aligned with the sensor. A portion of a flexible circuit assembly (24a, 58a) is bonded to the flat end wall. An electronics chamber is formed in a connector (18, 46) which is inverted and maintained at a selected height adjacent to the flat end wall of the support member to facilitate soldering of the flexible circuit to terminals (20, 48) in the connector and electronic components to the flexible circuit. The port fitting, when assembled to the support member, is also maintained at the selected height adjacent to the inverted connector to facilitate wire bonding the sensor to the bonded portion of the flexible circuit. The connector (18, 46) is then turned over, bending the flexible circuit assembly (24, 58) into a generally U-configuration, and attached to the support member. In one embodiment, as a last step in assembling the transducer, a tubular outer housing (3) is fitted over the connector/support member sub-assembly and its bottom portion is welded to a support flange of the port fitting while its top portion places a selected load on an O-ring (28) received about the connector as well as internal components of the transducer.

17 Claims, 11 Drawing Sheets

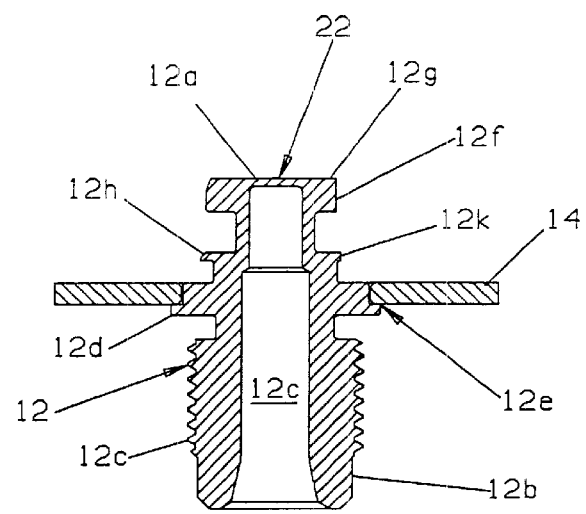
FIG 3
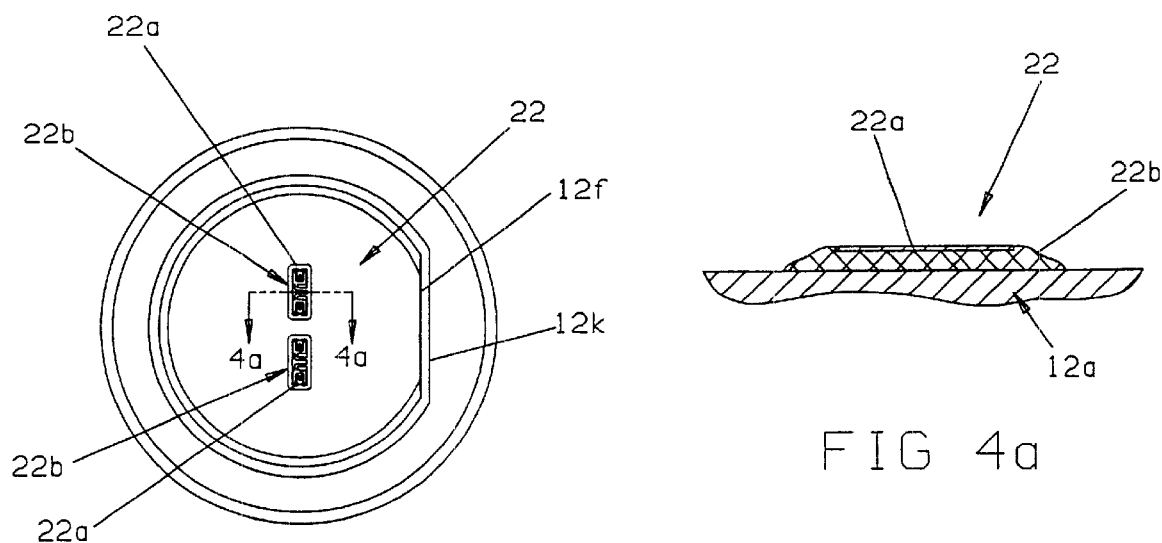
FIG 4
FIG 4a

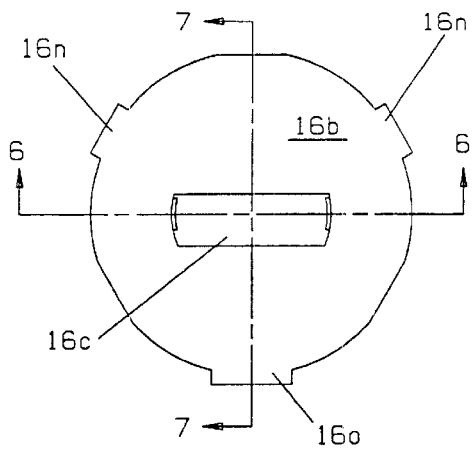
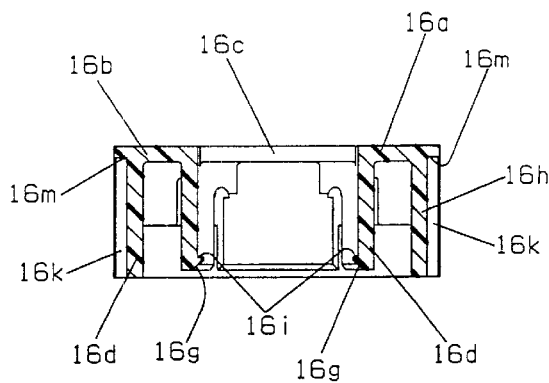
FIG 5        FIG 6
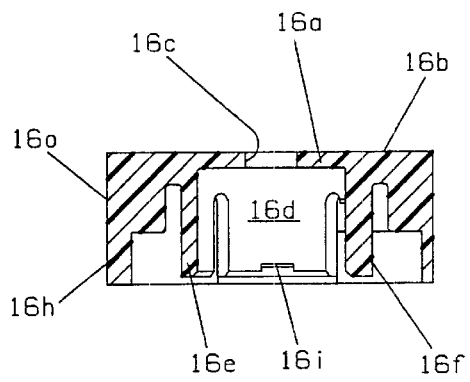
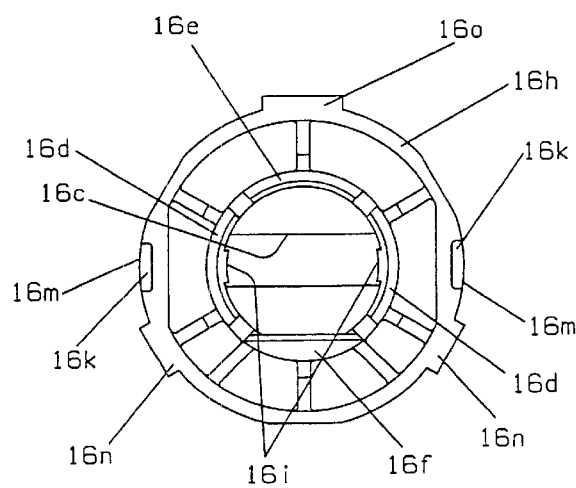
FIG 7        FIG 8

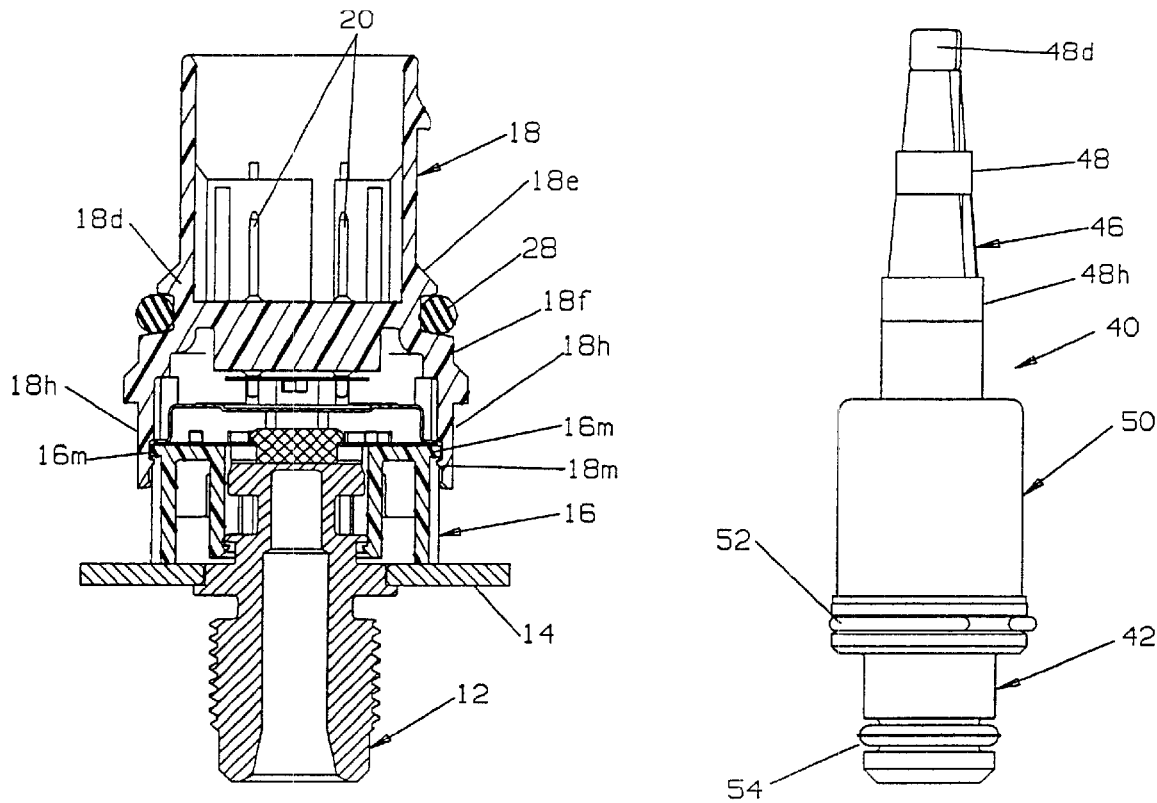
FIG 26
FIG 27
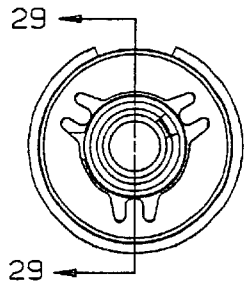
FIG 28
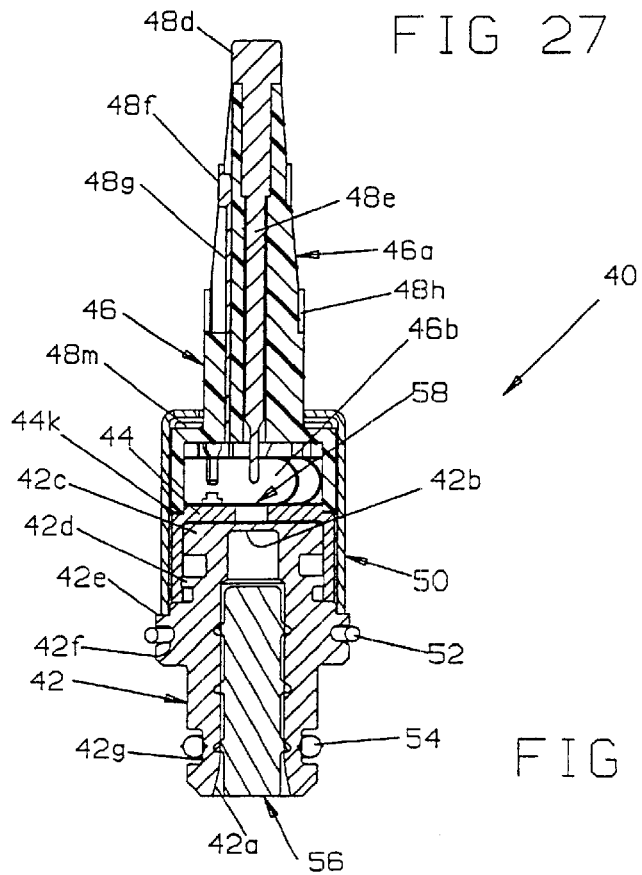
FIG 29

HERMETIC PRESSURE TRANSDUCER

This application claims priority under 35 USC Section 119 (e) (1) of provisional application No. 60/175,803 filed Jan. 12, 2000.

FIELD OF THE INVENTION

This invention relates generally to pressure transducers and more particularly to such transducers using strain gauge technology for sensing pressure change to produce an electrical signal related to such change and employing electronics for processing and amplifying the signal.

BACKGROUND OF THE INVENTION

Although the use of strain gauge technology for converting changes in fluid pressure to related electrical signals is known, there exists a need to provide transducers which are more easily manufacturable and which have improved reliability. There is also a need to minimize the cost of producing the transducers so as to make it more economically feasible to use them in given applications and thus increase manufacturing volume with resulting savings in large volume manufacturing techniques. For example, strain gauge technology involves the use of type 17-4 stainless steel for the diaphragm member exposed to the pressure being monitored; however, this material is relatively expensive and is difficult to machine so that it is desirable to design components which need to be formed of such material so that a minimum amount of material, machining time and waste material are involved. Another problem relates to the use of O-ring seals due to the difficulty in maintaining uniformity in the sealing surfaces during the crimping process.

With regard to making electrical connections among the transducer terminals, electronic components and sensor elements, typically one or more intermediate connection components have been used which involve soldering of individual components, as well as intermediate connections, with each soldering operation increasing a failure possibility and decreasing reliability. Strain gauge technology also involves the use of wire bonds between the strain gauge sensor elements and the transducer circuits and, if flexible circuits are employed, the problem that ultrasonic bonding occasions due to the associated vibration militates against obtaining reliable connections to a flexible circuit and toward using an intermediate connection device which again adds a process step and potential failure points.

SUMMARY OF THE INVENTION

It is an object of the present invention to provide a pressure transducer which has improved reliability and yet is relatively low in cost. Yet another object is the provision of a pressure transducer not subject to the prior art limitations noted above. Yet another object of the invention is the provision of an improved method for assembling an electronic package which incorporates a flexible circuit assembly.

Briefly described, in accordance with the invention, a tubular port fitting having a fluid receiving opening at one end and a closed, integrally formed diaphragm at an opposite pedestal end has an angular orientation feature and a locking feature for locking receipt of a support member in a selected angular orientation on the pedestal end. The support member has an apertured flat end wall surface received on the diaphragm portion, the aperture being in alignment with strain gauge sensor elements glass bonded to the diaphragm portion. A flexible circuit assembly has a first lobe section for mounting electronic components including an integrated circuit; the lobe section bonded to the rigid, flat end surface of the support with an opening aligned with the aperture in the flat surface. A second lobe section of the flexible circuit assembly is placed on a seating surface of an adjacent inverted connector held at an optimum level relative to the flat end wall surface, the connector having terminals with free distal ends extending into an electronics chamber in which the seating surface is disposed. The free distal ends are received through apertures in the second lobe section and soldered to respective circuit pads on the second lobe section along with soldering of electronic components on selected portions of the flexible circuit assembly. Wires are then ultrasonically bonded both to the strain gauge sensor elements and to circuit pads on the bonded lobe section of the flexible circuit assembly and then encapsulated by silicone gel.

According to a feature of a first embodiment, a cup-shaped EMC shield is received in the connector's electronics chamber, the shield provided with tabs which extend outwardly through openings in the connector's side wall beyond the outer periphery of the connector's walls. The connector is then turned over with an intermediate portion of the flexible circuit assembly extending between the lobe sections bent into a generally U-shape configuration and with wall portions of the connector locking onto the support member. According to a feature of the first embodiment, a radially extending mounting flange is hermetically welded to the port fitting and a hexagonal metal housing member is received over the body of the connector with the EMC shield tabs spring biased into electrical connection with the housing member and with the housing member applying a selected load to an O-ring placed in a circumferentially extending groove formed in the side wall of the connector body, the housing being welded around its lower periphery to the support flange to form a fluid seal and to maintain the loading on the O-ring.

In accordance with features of a second embodiment, a flip-chip IC having solder bumps on its bottom surface is used and is soldered to pads of the first lobe section of the flexible circuit assembly preferably at the same time that selected electronic components and the terminals are soldered, as by a reflow operation, to circuit pads on the second lobe section disposed in the connector. Epoxy is then dispensed adjacent to the integrated circuit which flows underneath the IC and upon curing forms an improved bond between the flexible circuit assembly and the flip-chip IC die.

Additional objects, features and methods of the invention will be set forth in part in the description which follows and in part will be obvious from the description. The objects and advantages of the invention may be realized and attained by means of the instrumentalities, combinations and methods particularly pointed out in the appended claims.

BRIEF DESCRIPTION OF THE DRAWINGS

The accompanying drawings which are incorporated in and constitute a part of the specification, illustrate preferred embodiments of the invention and, together with the description, serve to explain the objects, advantages and principles of the invention. In the drawings:

FIG. 3 is a cross-sectional view of the port fitting and support flange shown in FIG. 1;

FIG. 4 is a top plan view of the pedestal end of the port fitting and support flange of FIG. 3, FIG. 4a is an enlarged cross-sectional view taken on line 4a—4a of FIG. 4;

FIGS. 5 and 8 are top and bottom plan views, respectively, of the support ember of the FIG. 1 transducer;

FIG. 6 is a cross-sectional view taken on line 6—6 of FIG. 5;

FIG. 7 is a cross-sectional view taken on line 7—7 of FIG. 5;

FIG. 26 is a cross-sectional view similar to FIG. 1 of a transducer assembled except for the outer housing member;

FIGS. 27 and 28 are front elevational and top plan views, respectively, of a transducer made in accordance with a second embodiment of the invention;

FIG. 29 is a cross sectional view taken on line 29—29 of FIG. 28:

BRIEF DESCRIPTION OF PREFERRED EMBODIMENTS

Figure 1:
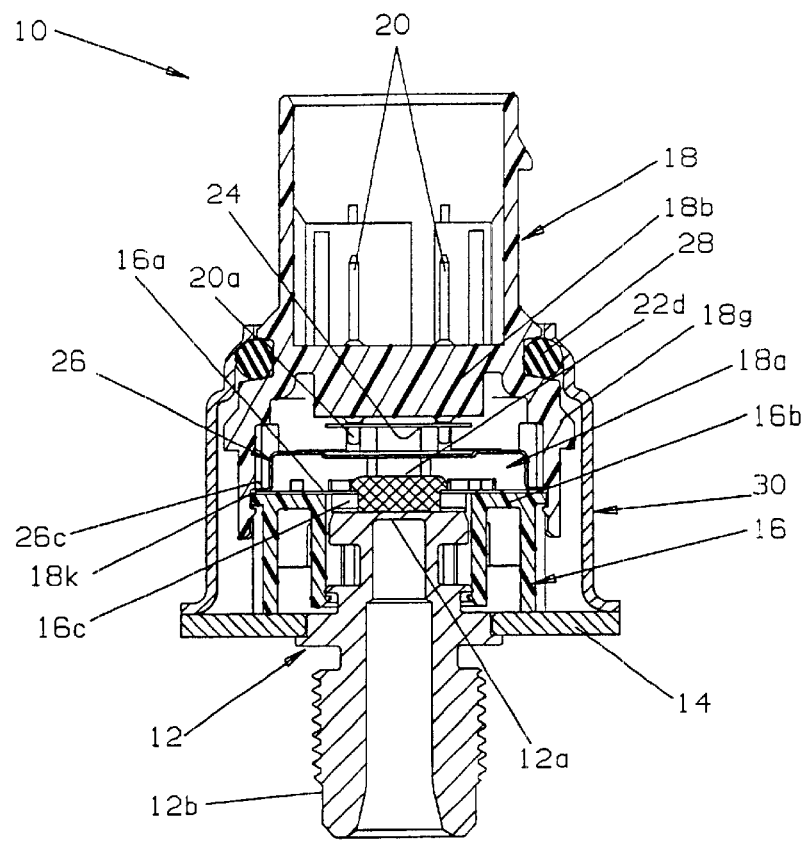
FIG. 1 is a cross-sectional view taken on line 1—1 of FIG. 2 of a transducer made in accordance with a first embodiment of the invention.
Figure 2:
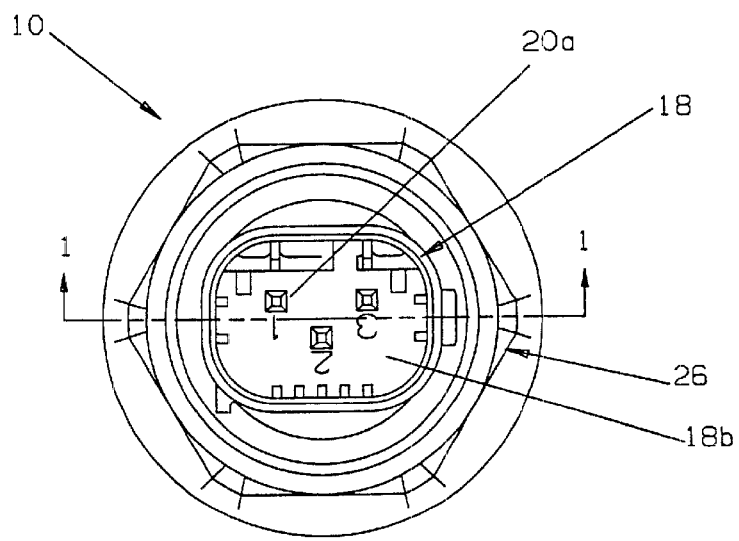
FIG. 2 is a top plan view of the FIG. 1 transducer.
Figure 9:
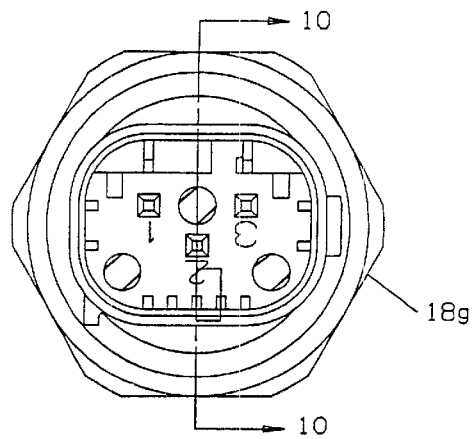
FIGS. 9 and 11 are top and bottom plan views, respectively, of the connector of the FIG. 1 transducer.
Figure 11:
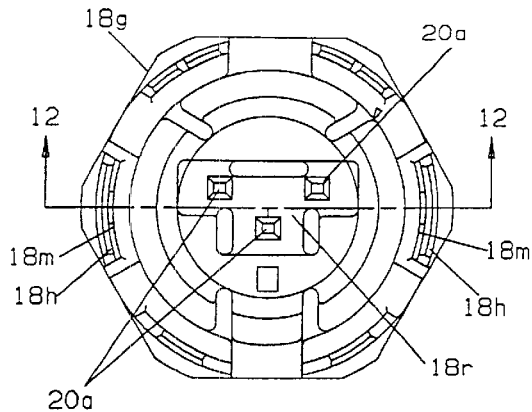
Figure 10:
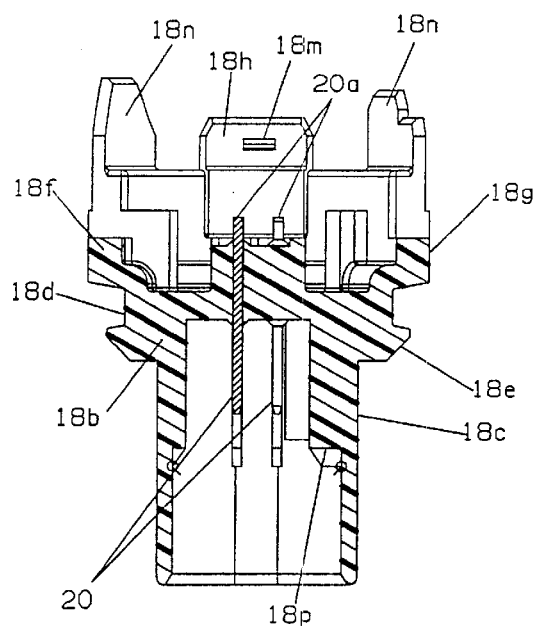
FIG. 10 is a cross-sectional view taken on line 10—10 of FIG. 9.
Figure 12:
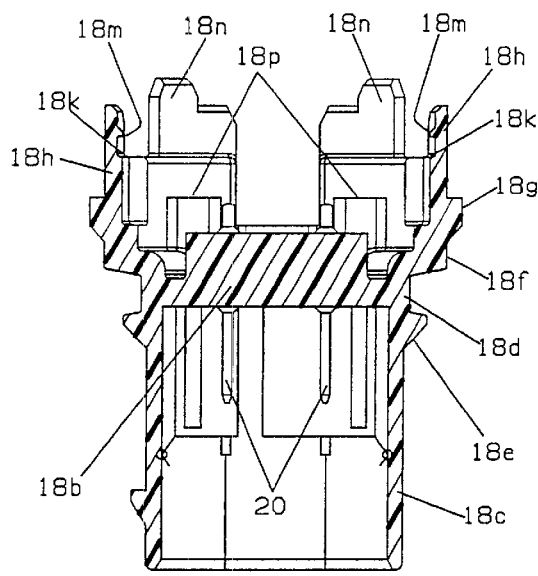
FIG. 12 is a cross-sectional view taken on line 12—12 of FIG. 11.

With reference to FIGS. 1–25, a pressure transducer made in accordance with a first embodiment of the invention will be described. FIGS. 1 and 2 show an assembled transducer 10 comprising a metallic tubular port fitting 12 having a first closed pedestal end with an integrally formed diaphragm portion 12a, and an elongated, open, coupling end 12b. A support flange 14 is fixedly attached to the port fitting as by hermetically welding thereto intermediate to the pedestal end and the coupling end. A support member 16 is disposed over the pedestal end and received on the support flange. The support member 16 is provided with an end wall 16a having a flat surface 16b formed with an aperture 16c therethrough aligned with a central portion of the diaphragm portion. A connector 18 formed of electrically insulative material is disposed on the support member with a circuit or electronics receiving chamber 18a formed between the connector and the support member and with an EMC shield 26 received in the cavity. An O-ring 28 is received in a seating groove formed in the connector with a metallic housing member 30 welded to the support flange and placing a selected sealing load on the O-ring.

In more specific detail, as best seen in FIGS. 3, 4 and 4a, port fitting 12 is formed with an open elongated coupling end 12b forming a fluid pressure receiving chamber 12c which extends up to an integrally formed diaphragm portion 12a in the pedestal end. Suitable mounting means, such as thread 12c, is provided on the elongated coupling end. A sensor assembly 22, mounted on the external, flat surface of diaphragm portion 12a, comprises strain gauge elements 22a attached to the diaphragm portion by glass material 22b as shown in FIG. 4a with the glass material bonded to both the strain gauge elements and the diaphragm surface in accordance with conventional strain gauge techniques. This technology preferably involves the use of type 17-4 stainless steel for the diaphragm to obtain desired material properties and bond between the glass material and the diaphragm.

Machining of type 17-4 stainless steel is difficult and the material is expensive so that, according to a feature of the invention, it is preferred to employ a separate, outwardly radially extending support flange 14 which is received on annular shelf 12d of the fitting and welded at 12e all around the periphery to form a hermetic seal. Any suitable material can be used for flange 14, such as type AISI 304 stainless steel. Use of the welded flange results in a less expensive port fitting having a support flange due to the difficulty and expense related to the volume of material which must be removed in a one piece design.

The pedestal end of port fitting 12 is provided with an angular orientation feature for placement of support member 16 comprising a longitudinally extending flat surface 12f which converts an otherwise circular cylindrical configuration to a non-circular configuration for reception of a complimentary shaped seating surface in support member 14 to be discussed. A locking feature for support member 14 is also formed on the pedestal end in the form of outwardly, radially extending generally annular lip 12h which preferably is also formed with a flat 12k formed at the same angular position of port fitting 12 as that of flat 12f.

Support member 16, best seen in FIGS. 5–8, is formed of suitable metal or plastic material, such as 30% glass filled UTEM 2310, has an end wall 16a having a substantially flat, rigid support surface 16b provided with a generally oblong aperture 16c through end wall 16a. A pedestal receiving seat is formed by discontinuous inner wall members 16d, 16e and 16*f*. Two opposed members 16*d* and member 16*e* form a portion of a circular cylinder while member 16*f* includes a flat surface complimentary to flat surface 12*f* of the pedestal. Opposed members 16*d* serve as legs formed with a radially inwardly extending catch 16*i* at their distal free ends which are receivable over lip 12*h*. An inclined camming surface 16*g* (FIG. 6) is preferably formed on the distal free end having a surface continuing on to the respective catch 16 to cam leg members 16*d* outwardly as the support member is placed onto the pedestal end and surface 16*g* is pressed against lip 12*h*. Support member 16 is also provided with a load bearing outer wall 16*h* which extends from the outer periphery of end wall 16*a*. Wall 16*h* is slightly longer than wall members 16*d*, 16*e* and 16*f*. Opposed longitudinally extending grooves 16*k* are formed in outer wall 16*h* leaving opposed ledges 16*m* which serve as a locking feature for connector 18, to be discussed. The outer periphery of support member 16 is also provided with an angular orientation feature for placement of the connector in the form of a plurality of longitudinally extending ribs, two ribs 16*n* having a first width and a third 16*o* having a second, different width.

Support member 16 is placed on the pedestal end of port fitting 12 with load bearing wall 16*h* received on flange 14 and the pedestal end received in the seat formed by wall members 16*d*, 16*e* and 16*f* and locked thereto in a selected angular orientation with aperture 16*c* in alignment with a central portion of the diaphragm portion 12*a*.

Connector 18, with particular reference to FIGS. 9–12, formed of suitable electrically insulative material, such as GE Noryl 830GTX, 30% glass filled, comprises a body portion 18*b* which mounts a plurality of elongated electrically conductive terminals 20 in spaced apart relation to one another. The terminals are identified on body portion 18*b*, as seen in FIG. 2, as 1, 2 and 3. The terminals extend through body portion 18*b* providing a distal end portion 20*a* for connection to a flexible circuit assembly 24, to be discussed. A side wall 18*c* extends in one longitudinal direction from body portion 18*b* forming a shroud enclosing the exposed terminal members. Also formed in the outer periphery of the connector in the vicinity of the body portion is a circular O-ring seating groove 18*d* formed with the outboard or shroud side 18*e* of the connector defining the groove having a smaller diameter than the opposite side 18*f* in order to expose a selected surface area of an O-ring disposed in the groove, as will be discussed in further detail below.

The connector is preferably formed with at least a portion having a selected non-circular outer peripheral configuration 18*g*, such as hexagonal, on the opposite side of body portion 18*b* from the shroud to facilitate mounting of the transducer, and with a plurality of leg portions extending therefrom. Opposed leg portions 18*h* are formed with an EMC shield seating shelf 18*k* and an inwardly, radially extending catch 18*m*. Legs 18*n* are spaced from one another sufficiently to form a passage for receipt of flexible circuit assembly 24 and to receive therebetween ribs 16*n*, 16*o* of support member 16 when the connector is assembled thereto as well as to allow spring tabs 26*d* to extend out beyond the connector, to be discussed below. When assembled, the outer peripheral portion of end wall 16*a* is received on ledge 18*k* and catches 18*m* are received over ledge 16*m* to lock the connector in a selected angular orientation to the support member and port fitting.

Figure 14:
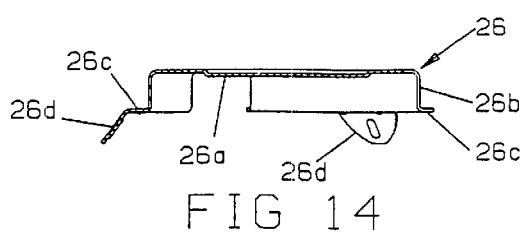
FIG. 14 is a cross-sectional view taken on line 14-14 of FIG. 13.
Figure 13:
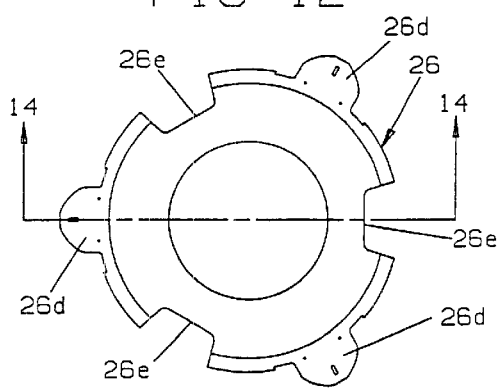
FIG. 13 is a plan view of the EMC shield of the FIG. 1 transducer.

EMC shield 26, FIGS. 13 and 14, formed of suitable metallic material, such as type AISI 304 stainless steel, is generally cup-shaped having an end wall 26*a* and side wall 26*b* depending therefrom formed with an outwardly radially extending flange 26*c* from which extend a plurality of spring tabs 26*d*. Cut-out portions 26*e* are provided to allow passage of flexible circuit assembly 24 into electronic circuit cavity 18*a*. Although only one cut-out portion 26*e* is required, providing three such portions spaced 120 degrees apart facilitates proper orientation of the shield in the connector. Shield 26 is not placed in the transducer assembly until after the flexible circuit assembly is installed as will be described below.

Figure 15:
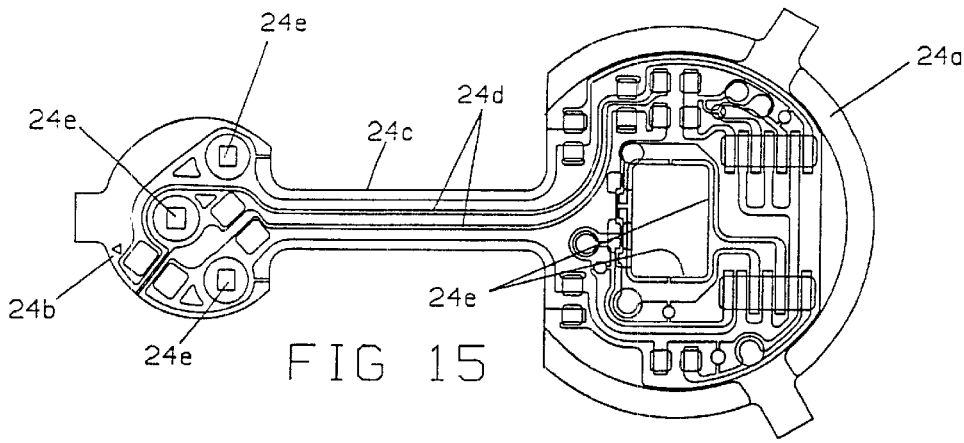
FIG. 15 is a top plan view of the flexible circuit assembly of the FIG. 1 transducer shown in a flat, unbent condition.

Flexible circuit assembly 24, FIG. 15, comprises a flexible substrate comprising first and second lobe portions 24*a*, 24*b* interconnected by an intermediate strip portion 24*c*, the substrate being formed of suitable electrically insulative material such as polyimide. Lobe portions 24*a*, 24*b* preferably include stiffener material, such as an additional layer of polyimide, to which the substrate material is bonded while lobe portion 24*a* includes a layer of adhesive such as pyralux LF 0200. Appropriate circuit traces 24*d* of copper, preferably plated with nickel and gold, are applied to the substrate.

Lobe portion 24*a* is bonded to the flat, rigid surface 16*b* of support member 16 with generally oblong opening 24*e* aligned with aperture 16*c* of the support member.

Figure 16:
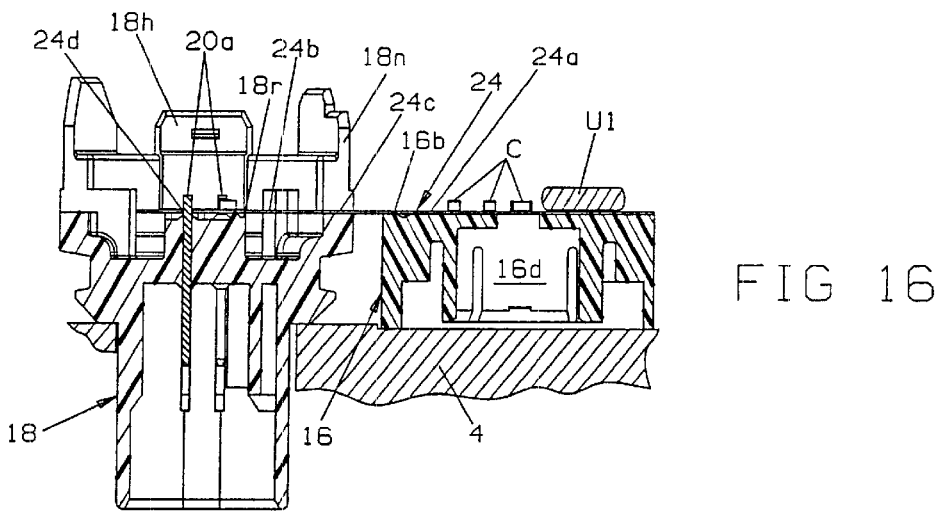
FIG. 16 is a cross-sectional view of a partially assembled transducer used to describe a preferred assembly method.
Figure 16A:
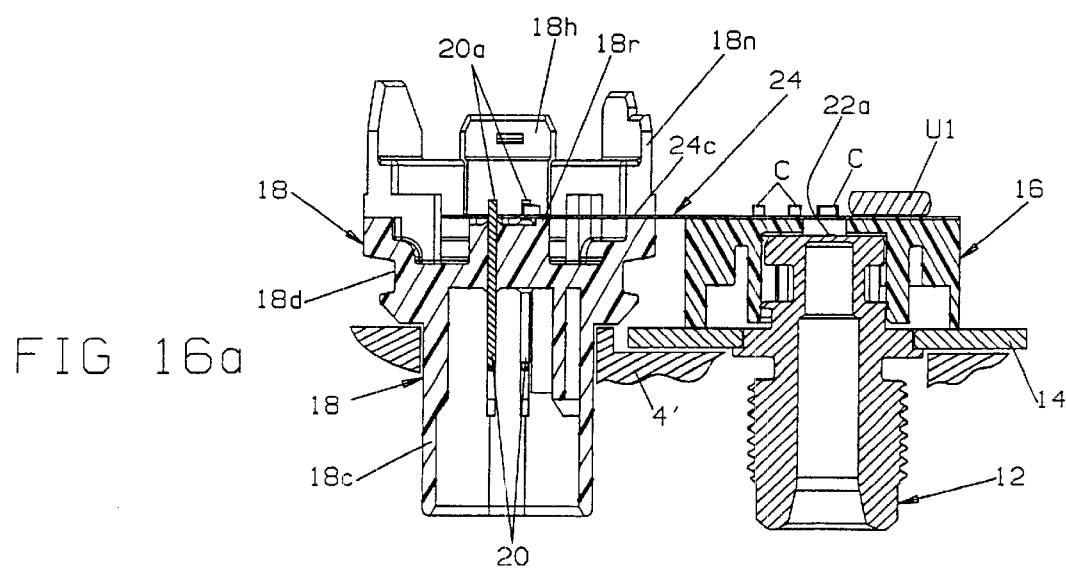
FIG. 16a is a cross sectional view taken on line 16a—16a of FIG. 17 of a partially assembled transducer, the view similar to FIG. 16 and used to describe a preferred modified assembly method.
Figure 17:
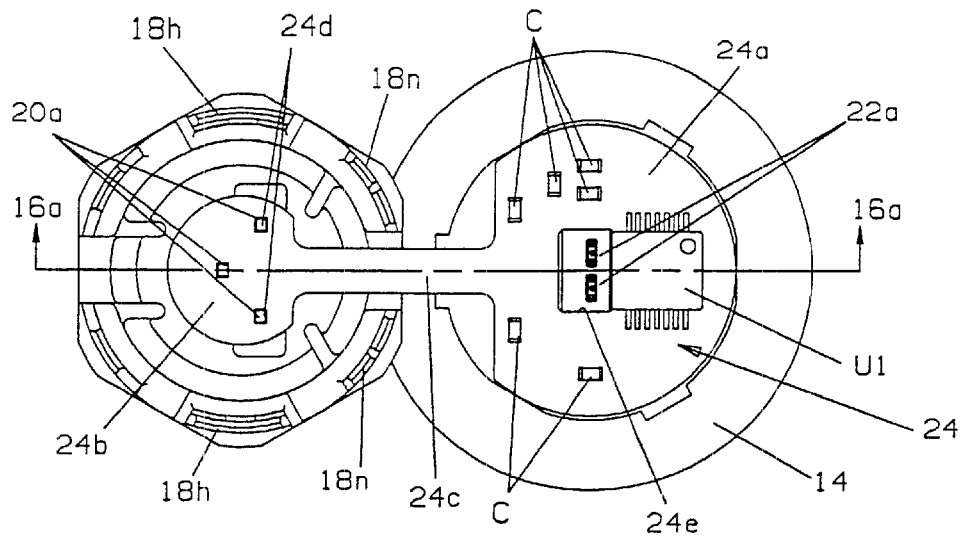
FIG. 17 is a top plan view of the FIG. 16a partially assembled transducer.

With reference to FIGS. 16, 16*a* and 17, a partial assembly comprising support member 16 with lobe portion 24*a* of flexible circuit assembly 24 bonded to support member 16 is placed on a suitable support 4, as by a pick and place mechanism (not shown) as indicated in FIG. 16. Connector 18, inverted relative to its final orientation once assembled to the support member, as shown in FIG. 1, is placed adjacent to the partial assembly on support 4 with lobe portion 24*b* received on a seating surface 18*r* of the connector and with the distal end portions 20*a* of conductive terminals 20 extending through respective apertures 24*e* in lobe portion 24*b* and with intermediate portion 24*c* trained between leg portions 18*n* of the connector. The support member 16 and the connector 18 are disposed so that the seating surfaces 18*r* of the connector and 16*b* of the support member lie in substantially the same plane so that the flexible circuit assembly extends in a substantially flat configuration to facilitate soldering, as by reflow soldering or the like, of distal end portions 20*a* to respective conductive pads on lobe portion 24*b* as well as integrated circuit U1 and various electronic components such as capacitors C to respective circuit trades 24*d*. Thus, by utilizing the above procedure all the solder joints in transducer 10 are effected at one time with no intermediate connections between the flexible circuit and the sense element except for a wire bonding operation to be described infra.

If desired, the above described soldering operation, alternatively, can be carried out with support member 16 already snapped on and locked to port fitting 12, as shown in FIG. 16*a*, with member 4' supporting connector 18 and the subassembly of port fitting 12 with support member 16 locked thereto.

Following the soldering operation, if the FIG. 16 procedure was followed, support member 16 of the subassembly is then put on the sensor end of port fitting 12 and locked thereto.

Figure 18:
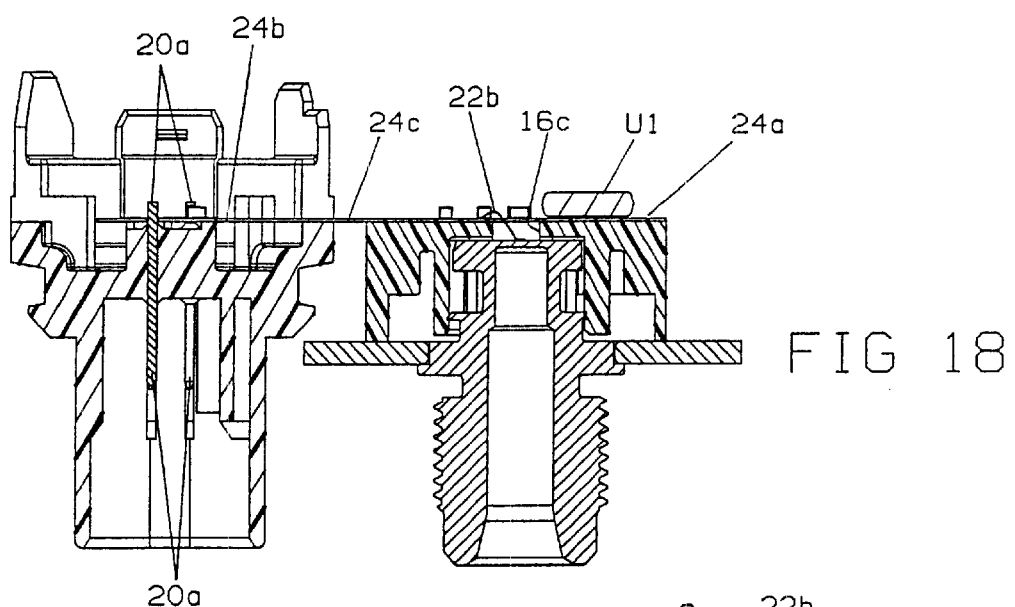
FIGS. 18 and 19; 20 and 21; 23 and 24 are views similar to FIGS. 16a and 17, respectively, of a partially assembled transducer shown at different stages of assembly.
Figure 19:
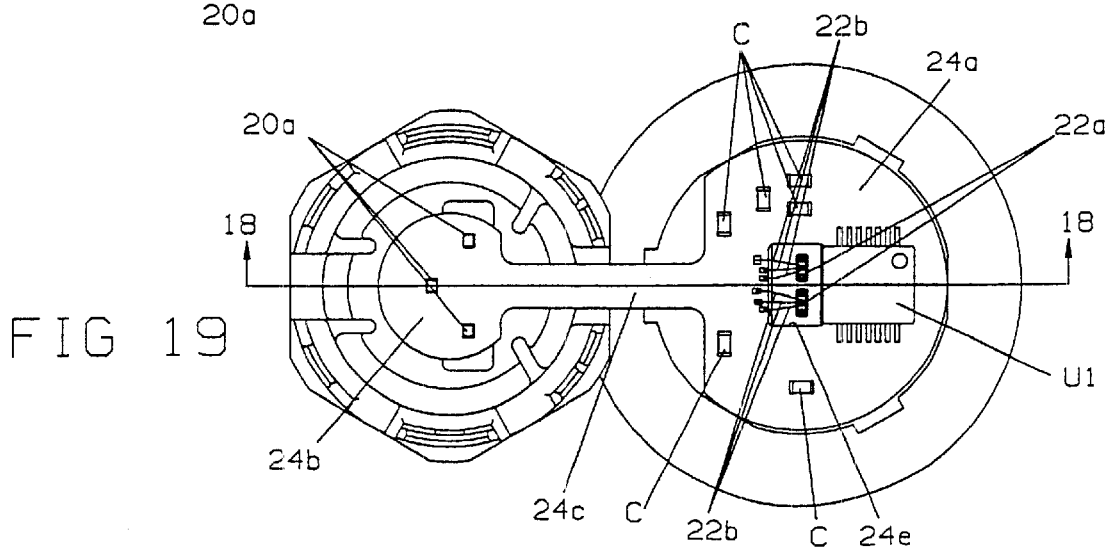
Figure 20:
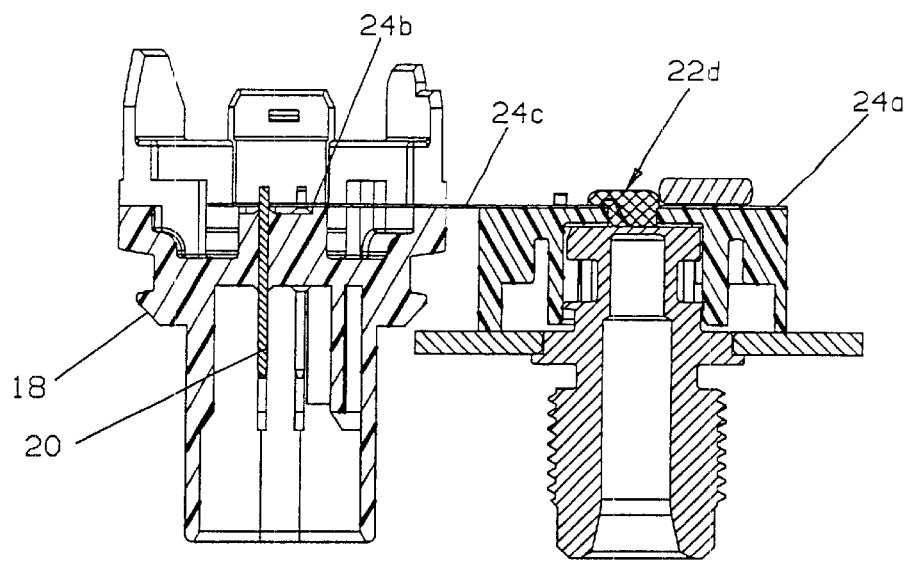
Figure 21:
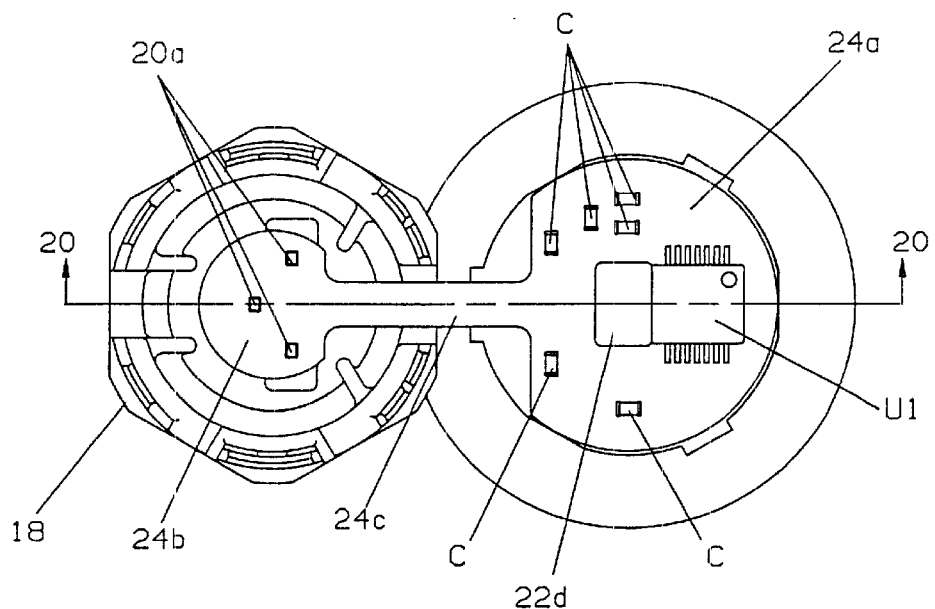
Figure 22:
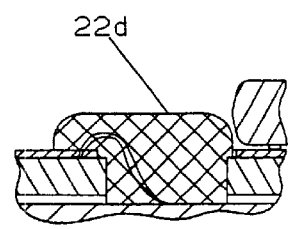
FIG. 22 is an enlarged, broken away portion of FIG. 20.

With reference to FIGS. 18 and 19, sensor elements 22*a* are then connected through aperture 16*c* of support member 16 and cut-out portion 24*e* of the flexible circuit assembly to respective circuit pads on lobe portion 24*a* by electrically conductive wires 22*b* formed of suitable material such as aluminum by a suitable attachment procedure, preferably ultrasonic bonding. Ultrasonic bonding to flexible circuit assembly 24 is made practical by virtue of having lobe portion 24a bonded to the flat rigid surface 16b of support member 16 so that vibration incident to the bonding procedure does not adversely affect the joint. Further, locking support member 16 having the bonded flexible circuit lobe with the wire bond connections thereon in a given angular orientation relative to the diaphragm portion prevents any twisting forces from being transferred to the wire bonds. After the wire bonding operation of sensor elements 22a to the flexible circuit assembly 24, wires 22b, the bonds of the wires, sensor elements 22a, as well as aperture 16c and opening 24c, are encapsulated as by a suitable gel such as electrically insulating silicone gel 22d, as seen in FIGS. 20–23.

Figure 23:
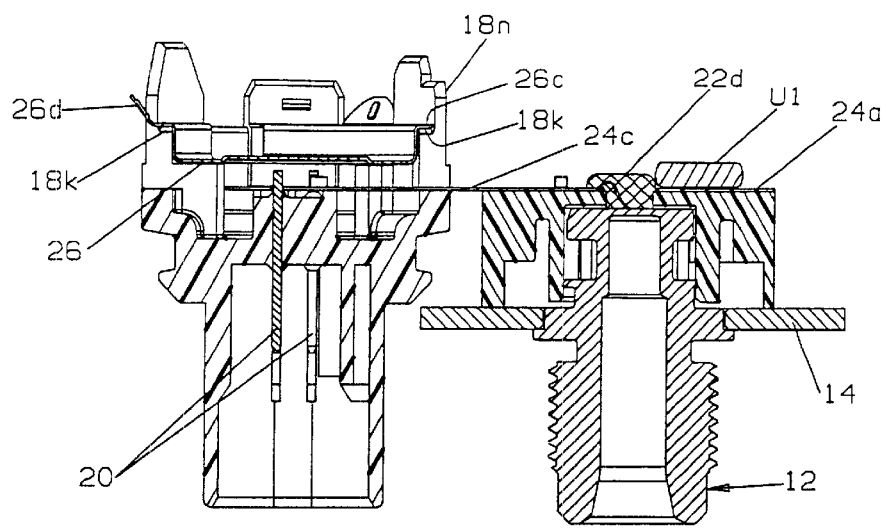
Figure 24:
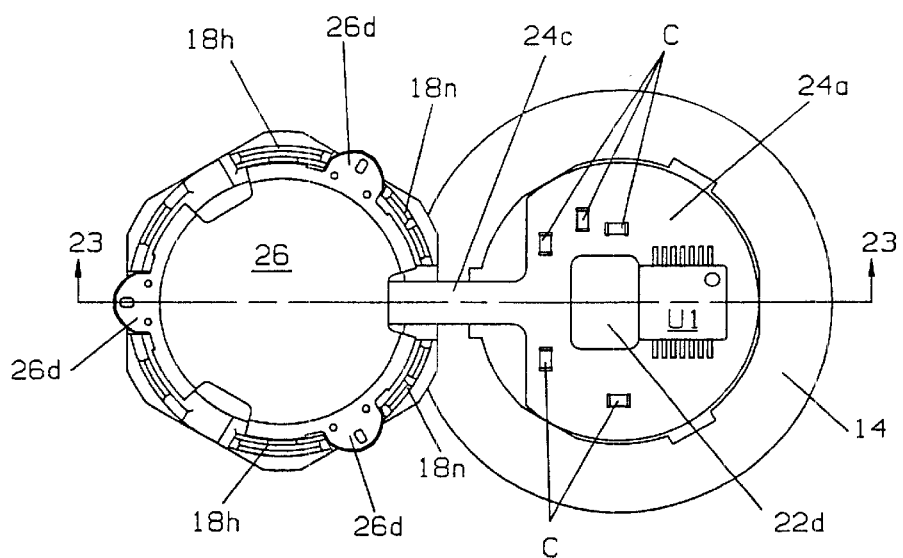
Figure 25:
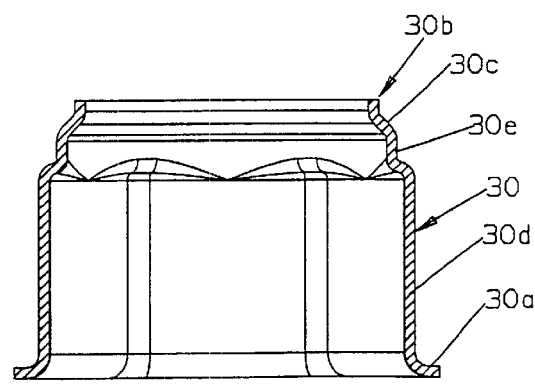
FIG. 25 is a longitudinal cross-sectional view taken through the metal outer housing member of the FIG. 1 structure.
Figure 30:
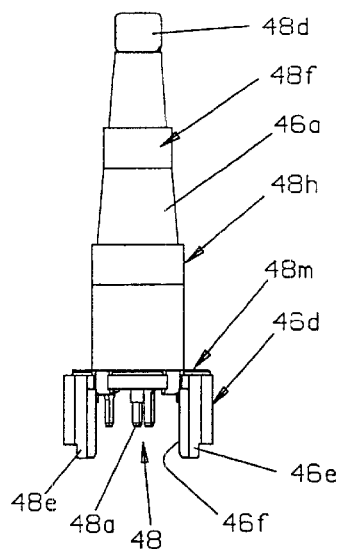
FIGS. 30 and 31 are front elevational and top plan views, respectively, of the connector of the second embodiment.
Figure 31:
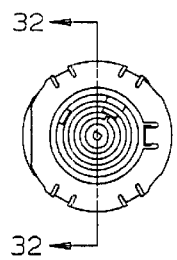

After completion of installation of the electronics, EMC shield 26 is placed in connector 18, FIGS. 23, 24, with annular lip 26c received on shelf 18k and with tabs 26d extending between wall portions 18n, 18n out beyond the outer periphery of the wall portions. Intermediate portion 24c of the flexible circuit assembly is in alignment with one of the cut-out portions 26e. Then, as seen in FIG. 26, connector 18 is inverted and catches 18m of wall portions 18h are snapped onto ledges 16m. O-ring 28 is then inserted in O-ring seat 18d and metallic housing 30, FIG. 25, is placed over connector 18 as seen in FIG. 1. Housing 30 is an open ended tubular member formed of suitable metallic material, such as type AISI 304 stainless steel and is formed with an outwardly extending annular flange 30a having a circular outer diameter at a first end and an opposite circular second end 30b having an inner diameter slightly larger than portion 18e of the connector body. An inclined surface 30c in the form of a frustocone with its smaller diameter formed by circular end 30b serves as a sealing and force transfer surface as will be explained below. A side wall 30d, preferably the same configuration as that of non-circular portion 18g of the connector with which it mates, extends from flange 30a to intermediate circular wall section 30e having an inner diameter slightly larger than portion 18f of the connector, wall section 30e interconnecting with the large diameter end of the frustoconical wall 30c. Flange 30a of the housing member is welded to flange 14 all around its periphery to form a hermetic seal (see FIG. 1). The distance between frustoconical wall 30c and the first end of housing member 30 is chosen so that a selected load is placed on the O-ring to form an efficient fluid tight seal and to maintain an axial load on the entire stack of components. The load on housing member 30 through the O-ring helps to maintain intimate electrical connection of the ground trace on flexible circuit assembly 24 and flange 26c of EMC shield 26 by means of force transferred through shelf 18k. Tabs 26d of EMC shield extending outwardly beyond the side wall members of connector 18, as shown in FIGS. 23, 24, are spring biased into effective electrical engagement with the inside wall of housing member 30.

A second embodiment, shown in FIGS. 27–40, comprises structure which is particularly conducive to making a miniaturized transducer useful for certain applications in which available space is especially limited, for example, when used for vehicular brake pressure transducer applications. Transducer 40 made in accordance with the second embodiment, as seen in FIGS. 27–29, comprises a tubular port fitting 42 having a bore 42a extending from one end to a diaphragm portion 42b in a pedestal end 42c. Strain gauge sensor elements are mounted on diaphragm portion 42b as in the first embodiment. A support member 44 is received on pedestal end 42c and a connector 46 of electrically insulating material is received on support member 44. A metallic tubular housing member 50 is disposed over the body portion of the connector and extends to a mounting annular shelf on port fitting 42. A spring ring 52 and a gasket 54 are received in respective annular grooves in the outer periphery of port fitting 42. A suitable plug 56 is received in bore 42a of port fitting 42. A circuit chamber 46b is formed in connector 46 which receives a flexible circuit assembly 58 and a plurality of terminals extend through the connector in spaced apart relation and have respective circular contact portions 48h, 48f and 48d, having progressively smaller diameters which are disposed at longitudinally spaced locations on an exposed surface of a generally tapered, elongated connector portion.

Support member 44, best seen in FIGS. 33–36, is similar to support member 16 of the first embodiment and is made of any suitable material such as that used for support member 16. Member 44 has an end wall 44a with a rigid flat end surface 44b formed with an oblong aperture 44c for alignment with strain gauge sensor elements mounted on diaphragm portion 42b. A tubular side wall 44d extends from end wall 44a and is formed with longitudinally extending slots 44e from the free distal end of the wall to provide some flexibility. External, longitudinally extending crush ribs 44m form an interference fit with housing member 50 to aid in manufacturing. Crush ribs 44m hold the housing onto the support member and help to keep the connector in place prior to welding of housing member to port fitting 42, to be disclosed below. Radially inwardly extending locking catches 44f are disposed at opposed locations on the distal end portion of the side wall. A longitudinally extending flat surface 44g is also formed on the inside profile of the side wall providing a non-circular, angular orientation feature which cooperates with a flat surface of the pedestal end of the port fitting in the same manner as in the first embodiment. The flat surface of the pedestal end is also used as a reference surface for placement of the strain gauge sensor elements in a selected orientation on diaphragm portion 42b. Support member 44 is placed onto the pedestal end and lockingly engaged by catches 44f received over annular, radially outwardly extending flange 42d as shown in FIG. 29.

Figure 32:
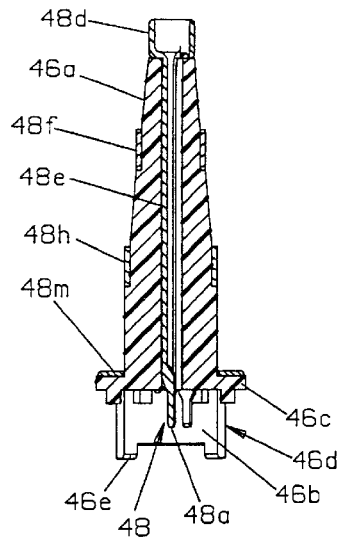
FIG. 32 is a cross-sectional view taken on line 32—32 of FIG. 31.
Figure 33:
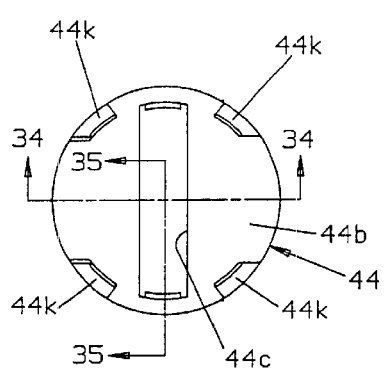
FIGS. 33 and 36 are top and bottom plan views, respectively, of the support member received on the pedestal end of the port fitting of the second embodiment.
Figure 34:
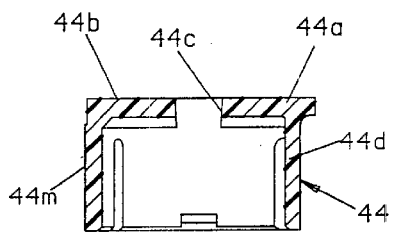
FIG. 34 is a cross-sectional view taken on line 34—34 of FIG. 33.
Figure 35:
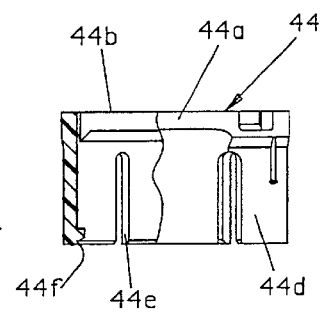
FIG. 35 is a side elevational view partly in cross-section taken on line 35—35 of FIG. 33.
Figure 36:
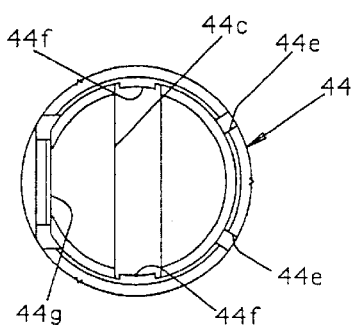
Figure 37:
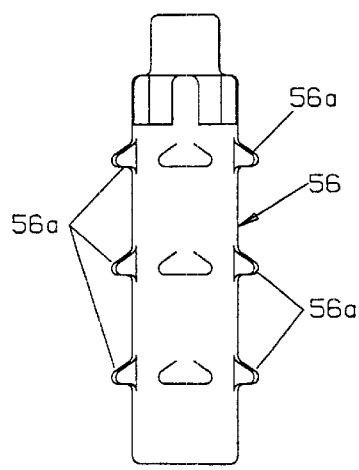
FIG. 37 is an elevational view of a plug member received in the port fitting of the second embodiment.

Connector 46, formed of suitable electrically insulative material, has an elongated terminal mounting portion 46a in which three electrically conductive terminals 48 are mounted in spaced apart relation. In order to provide spaced apart contacting surfaces each contact has a cylindrical portion with a progressively decreasing diameter. With reference to FIGS. 29 and 32, terminal 48a comprises cylindrical contact portion 48d disposed at the small outer diameter end of mounting portion 46a with elongated portion 48e extending therefrom through mounting portion 46a into a circuit chamber 46b. The next adjacent cylindrical contact portion 48f has a slightly larger outer diameter and is spaced longitudinally from contact portion 48d. Contact portion 48f has an elongated portion 48g (FIG. 29) which extends therefrom through mounting portion 46a into circuit chamber 46b. The next adjacent cylindrical contact portion 48h has a still larger outer diameter and is spaced longitudinally from contact portion 48f and has an elongated portion (not shown) which extends therefrom through mounting portion 46a into circuit chamber 46b. A ground ring 48m is disposed on radially outwardly extending annular shelf 46c. Side wall 46d includes projections 46e which are receivable in recesses 44k of support member 44 (FIG. 33). An opening 46f is formed in side wall 46 to provide access for flexible circuit assembly 58 to pass through the wall.

Figure 38:
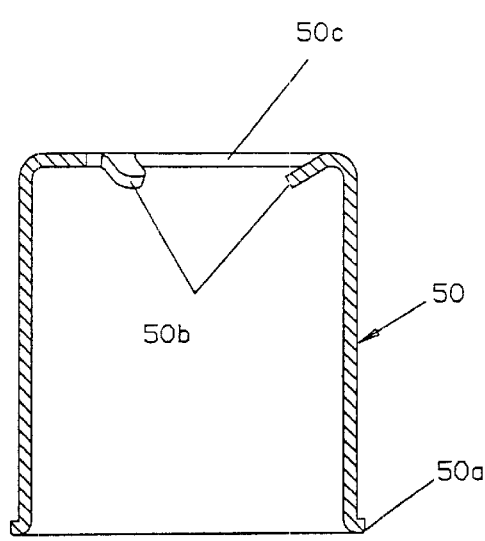
FIG. 38 is a longitudinal cross-sectional view of the outer housing member of the second embodiment.

Housing 50, FIG. 38, an open tubular cylindrical member formed of electrically conductive material such as type AISI 304L stainless steel, has a mounting flange 50*a* at one opposite end and a plurality of inwardly and downwardly projecting tabs 50*b* at its opposite end 50*c*. As seen in FIG. 29, the housing member is received over a portion of connector 46 and support member 44 with mounting flange 50*a* received on shoulder 42*e* of tubular fitting 42 and with tabs 50*b* biased against conductive contact ring 48*m*. The housing is suitably attached to fitting 42 as by welding. End 50*c* forms a generally flat surface to facilitate reception of a tool for installing the transducer and is made to withstand forces required for insertion into a fixture in brake apparatus or the like.

Port fitting 42 is formed with a circumferentially extending annular groove 42*f* for receipt of spring ring 52 used in mounting the transducer to a fluid pressure source and O-ring groove 42*g* for receipt of O-ring 54 to provide a fluid seal. Plug 56 is placed into the port fitting bore 42*a* to consume most of the volume of the blind hole and is provided with passages to allow the fluid being monitored to pressurize the diaphragm portion of the sensor. Plug 56 is formed of suitable material such as an elastomeric material and is provided with radially extending gripping knobs 56*a* (FIG. 37) to provide a radial interference fit for effectively interlocking with the port fitting while providing passage to the interior of the bore. Other materials such as plastic or metal having suitable engaging means and longitudinally extending passages could also be used, if desired. It will be noted that bore 42*a* is formed with an inner bore portion which defines the diaphragm diameter and an outer, larger diameter portion equal to or longer in axial length than the axial length of the inner diameter to facilitate the machining process by allowing flow of cutting fluid and removal of machining chips.

Figure 39:
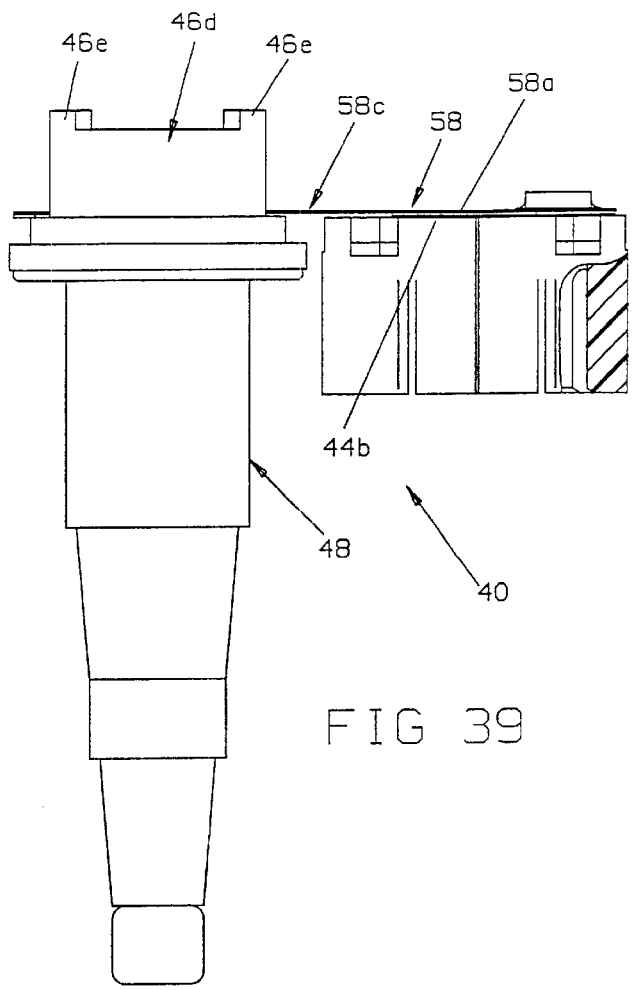
FIGS. 39 and 40 are elevational and top plan views of a partly assembled transducer made in accordance with the second embodiment.
Figure 40:
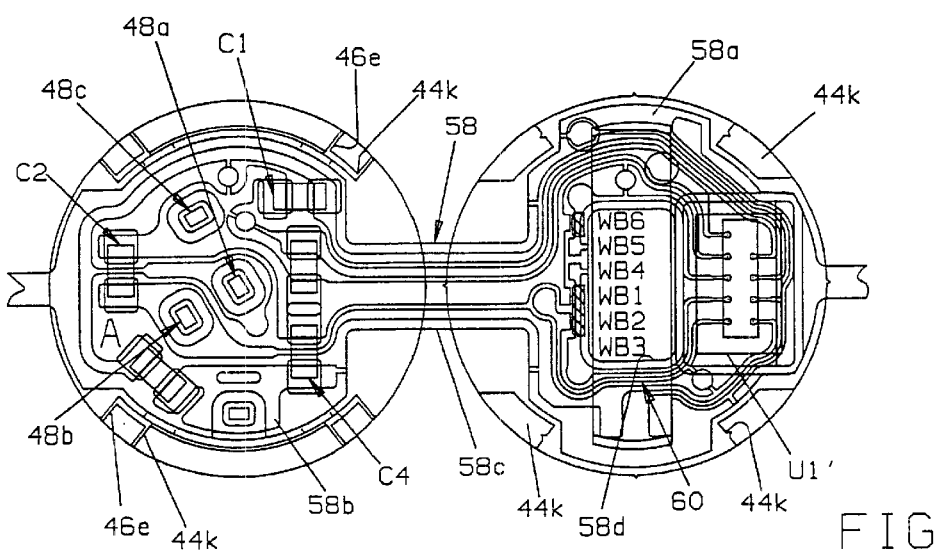

Transducer 40 is assembled, as is transducer 10 of the first embodiment, by snapping support member 44 onto the pedestal end of port fitting 42. Lobe portion 58*a* of flexible circuit assembly 58 is securely bonded to rigid flat surface 44*b* of the support member and the partial assembly is placed adjacent to an inverted connector 48 in the same manner as in the first embodiment and as shown in FIGS. 39 and 40 with the seating surfaces for lobe portions 58*a* and 58*b* lying in essentially the same plane. Flexible circuit assembly 58 is formed similarly to flexible circuit assembly 24 with lobe portions 58*a* and 58*b* formed with stiffening material such as polyimide and lobe 58*a* additionally having a lower layer of adhesive for attachment to support member 44. An oblong opening 58*d* is formed in lobe portion 58*a* for alignment with aperture 44*c* of the support member and the strain gauge sensor elements (not shown) bonded to diaphragm portion 42*b* in the same manner as in the first embodiment described above. The flexible circuit assembly is provided with selected circuit traces and bonding pads 60. Selected electronic devices, for example, capacitors C1, C2, C4, C5, C6 are placed on lobe portion 58*b* and flip-chip integrated circuit U1' having solder bumps on its lower surface is placed on respective bonding surfaces of lobe portion 58*a* and soldered thereto as by a reflow procedure. Preferably, epoxy material is dispensed adjacent to the integrated circuit, for example, along two opposed edges of flip-chip U1' allowing the material to flow beneath the die in between the solder bumps to enhance its connection to the flexible circuit assembly. Suitable wires, e.g., aluminum, are bonded between the strain gauge sensor elements and the flexible circuit assembly, as in the first embodiment, and encapsulated by suitable gel such as silicone.

Connector 46 is then inverted with intermediate portion 58*c* of the flexible circuit assembly folding into a U-shape configuration and with feet 46*e* of the connector received in recesses 44*k* of the support member. Housing member 50 is then placed over the connector and support member and welded to port fitting 42 and plug 56 inserted to complete the assembly.

Thus, it will be seen from the above, a transducer made in accordance with the invention has a package which supports sensor elements, provides suitable protection from the environment for the intended application and is manufacturable at an affordable cost. With respect to the first embodiment, protection includes sealing against environmental ingress, shielding against EMI, and withstanding other common conditions associated, for example, with an automotive under hood environment. The package allows for easy installation yet resists high assembly torque. In the second embodiment, installation is effected merely by pushing the package into place. With respect to the first embodiment, a flange is welded to a threaded port providing a less expensive part relative to a one piece version due to the volume of material that is removed from a one piece design. Machining of type 17-4 stainless steel is difficult and the material is relatively expensive. In both embodiments, the invention provides the feature of a support member utilizing interlocking features which holds the flex circuit in place at the proper height and orientation for soldering and wire bonding. The interlocking features on the support member also minimize movement of the attached flex circuit and therefore reduce the possibility of wire bonding damage.

The snap locking connector/support features allow for the connector to be snapped over the support member so that the stack is held together to facilitate future processing. This avoids the situation where the flex circuit could cause the connector to spring back preventing automatic installation of the O-ring and making it more difficult to add the hexagonal housing member.

In the first embodiment, the electrical connection between the flex circuit and the hexagonal housing member (Case GND) is conveniently effected by using a spring load EMC shield biased against the housing member. The hexagonal housing member can be made of stainless steel material at a reasonable price which provides significantly better resistance to the environment compared to conventional plated steel while avoiding relatively costly plating steps. Forming the housing member in a hexagonal configuration by stamping provides a hexagonal internal configuration which can be used with a corresponding configuration on the connector thereby providing orientation as well as anti-rotation and means for applying torque for installation. Using the hexagonal housing member as the final component to be assembled allows for a bottoms up assembly without the walls of the member impairing access to the strain gauge elements. This approach also allows the flex circuit and connector to be completely unfolded during soldering and during the wire attachment process which aids in wire bonding. The separate hexagonal member design allows for an O-ring to be used for providing the environmental seal rather than RTV or other sealant. A one piece hexagonal body is typically crimped making it difficult to use an O-ring seal. The provision of the hexagonal member separate from the port fitting or body allows for the pedestal to be machined as an integral part of the port fitting without adding to the height of the hex. Using a hexagonal body requires that either the pedestal be welded, or the pedestal must be machined on top of the hexagonal body, thus making a taller package requiring much more steel. It is impractical as well as too costly to make a one piece hexagonal body with walls and a pedestal.

Although the invention has been described with regard to specific preferred embodiments thereof, variations and modifications will become apparent to those skilled in the art. For example, reflow soldering a flip-chip IC to a portion of a flexible circuit bonded to a rigid support member can be used in electronic packages other than pressure transducers. Likewise, the feature of wire bonding to a portion of a flexible circuit bonded to a rigid surface to thereby prevent adverse affects on bonded connections due to vibration incident to ultrasonic bonding procedures, can be used in various electronic packages. It is, therefore, the intention that the appended claims be interpreted as broadly as possible in view of the prior art to include all such variations and modifications.

What is claimed:

1. A pressure transducer comprising a generally tubular port fitting having a closed pedestal end formed with a diaphragm portion lying generally in a plane, an elongated coupling portion for mounting the transducer to a fluid pressure source to be monitored, the pedestal end formed with a locking feature and with an angular orientation feature, a support flange extending radially outwardly from the port fitting intermediate to the pedestal end and the coupling portion, a support member received on the pedestal end, the support member having an outer wall formed with an angular orientation feature and an inner pedestal end receiving seat with an angular orientation feature complimentary to the angular orientation feature of the pedestal end to provide a selected angular orientation of the support member relative to the pedestal end, inner legs extending from the support member formed with a locking feature which cooperates with the locking feature of the port fitting to lock the port fitting and the support member together, the support member having a flat, relatively rigid, surface lying in a plane generally parallel to the plane in which the diaphragm lies and being formed with an aperture therethrough aligned with a central portion of the diaphragm portion, a connector formed of electrically insulative material having a body portion mounting a plurality of electrically conductive terminals in spaced apart relation to one another, each terminal having an end portion extending through a flexible circuit assembly receiving seat on the body portion, a plurality of legs extending from the body portion, the legs having an angular orientation feature and a locking feature, the legs being lockingly received on the support member in a selected angular orientation of the connector to the support member, a flexible circuit assembly having first and second portions joined together by an intermediate strip portion, the first portion bonded to the flat, relatively rigid surface of the support member, the first portion having an opening therethrough aligned with the aperture in the flat surface of the support member and the second portion received on the flexible circuit assembly receiving seat of the connector and having conductive traces soldered to the terminals, electronic components being soldered to conductive traces of the first portion, and a sensing element disposed on the diaphragm portion and having wires extending between and bonded to the sensing element and to conductive traces of the first portion.

2. A pressure transducer according to claim 1 in which the support flange is welded to the port fitting.

3. A pressure transducer according to claim 1 in which the coupling portion of the port fitting is formed with a screw thread.

4. A pressure transducer according to claim 1 in which the coupling portion of the port fitting is formed with a bore having an open end and a plug having longitudinally extending fluid passages is received in the bore.

5. A pressure transducer according to claim 4 in which the plug is formed of elastomeric material and substantially fills the bore.

6. A pressure transducer according to claim 1 in which the connector is formed with an O-ring seating groove and an O-ring is disposed in the O-ring seating groove and further comprising a tubular housing member having a longitudinal axis and having generally circular opposite end portions, one opposite end having a truncated conical surface aligned with the O-ring received in the O-ring seating groove, the other opposite end having a radially extending flange fixedly attached to the support flange of the port fitting, the longitudinal distance between the two opposite end portions of the housing member selected so that upon attachment of the housing member to the support flange a selected load is placed on the O-ring through the truncated conical surface.

7. A pressure transducer according to claim 6 in which the housing member is metallic and a cross-section of the housing member taken perpendicular to the longitudinal axis at a location intermediate the opposite ends thereof is polygonal.

8. A pressure transducer according to claim 6 in which a generally cup-shaped metallic shield having a tubular side wall with a distal free end and a bottom wall is received in the connector which forms a circuit enclosure disposed over a portion of the flexible circuit assembly with the distal free end engaging the first portion, and at least one tab extends outwardly from the side wall and is biased against the tubular housing member.

9. A pressure transducer according to claim 8 in which the flexible circuit assembly includes a ground conductive trace and the distal free end of the tubular side wall of the shield is aligned with and biased into engagement with the ground conductive trace.

10. A pressure transducer according to claim 1 in which the connector includes an outwardly, radially extending shelf formed on the body with a terminal layer on the shelf and a metallic, open ended tubular housing has an inwardly extending tabs at one end, the housing is received over the connector and support member with the tabs biased against the terminal layer on the shelf.

11. A pressure transducer comprising a generally tubular metallic port fitting having a closed pedestal end formed with a diaphragm portion and an elongated coupling portion for mounting the port fitting to a body having a fluid pressure source, the pedestal end formed with an outwardly extending locking flange and with a non-circular outer periphery, a support flange extending radially outwardly from the port fitting intermediate the pedestal end and the coupling portion a support member having a pedestal receiving seat formed with a non-circular periphery complimentary to the outer periphery of the pedestal end, longitudinally extending inner legs having distal free ends formed with a radially inwardly extending catch for locking engagement with the locking flange of the port fitting, the support member having a wall with a flat surface formed with an aperture therethrough aligned with a central portion of the diaphragm portion, a flexible circuit assembly having a first portion bonded to the flat surface of the support member and being formed with an opening aligned with the aperture in the flat surface of the support member, the flexible circuit substrate having a terminal attachment portion extending away from the support member, strain gauge sensing elements mounted on the diaphragm portion of the pedestal end of the port fitting and wire leads bonded to the strain gauge sensing elements extending to and bonded to the flexible circuit assembly, and a connector formed of electrically insulating material having a body portion mounting a plurality of electrically conductive terminals in spaced apart relation to one another, the terminal attachment portion of the flexible circuit assembly bent back in a generally U-shape configuration and attached to the terminal members.

12. A Pressure transducer according to claim 11 in which the support flange is welded to the port fitting.

13. A pressure transducer according to claim 11 in which an O-ring seating groove is formed around the outer periphery of the connector body and further comprising an O-ring received in the O-ring seating groove and an outer housing member having an angular surface aligned with the O-ring, the outer housing member being fixedly attached to the support flange of the port fitting so that the angular surface applies a compressive force on the O-ring.

14. A method for assembling a strain gauge transducer comprising the steps of taking a support member having a flat surface with an aperture formed through the flat surface, taking a flexible circuit assembly having a first portion formed with an opening therethrough and a second terminal attachment portion extending therefrom, bonding the first portion of the flexible circuit assembly to the flat surface of the support member with the opening aligned with the aperture, placing the support member on a support so that the flat surface faces upwardly, placing a connector member of electrically insulating material in which a plurality of electrical terminals are mounted in spaced apart relation adjacent to the body and support member, the connector being inverted relative to its orientation when mounted on the support member, the connector member having a surface through which an end of each terminal protrudes, the connector member being placed so that the flat surface of the support member and the surface of the connector through which an end of each terminal protrudes lie in substantially a common plane, soldering the terminals to the terminal attachment portion of the flexible circuit assembly and soldering electronic components to the flexible circuit assembly, taking a body having a diaphragm formed with a flat surface, mounting strain gauge sensor elements on the flat surface, taking the body and attaching the body to the support member so that the diaphragm with the strain gauge sensor elements is aligned with the aperture in the support member, bonding wires to the strain gauge sensor elements and to the first portion of the flexible circuit assembly, and inverting the connector member and attaching the inverted connector member to the support member.

15. A method of assembling an electronic package comprising the steps of taking a flexible circuit assembly having a first electronics mounting portion and a second portion extending therefrom, bonding the first portion of the flexible circuit assembly to a flat, relatively rigid substrate, leaving the second portion in a flexible condition, and soldering electronic components to the first portion of the flexible circuit assembly, said electronic components including a flip-chip IC having solder bumps on a bottom surface thereof and including the step of dispensing epoxy onto the flexible circuit assembly adjacent to the flip-chip IC to cause the epoxy to flow underneath the flip-chip IC among the solder bumps to increase the strength of the joint between the flip-chip IC and the flexible circuit assembly.

16. A method of assembling an electronic package comprising the steps of taking a flexible circuit assembly having a first electronics mounting portion and a second portion extending therefrom, bonding the first portion of the flexible circuit assembly to a flat, relatively rigid substrate, leaving the second portion in a flexible condition, soldering electronic components to the first portion of the flexible circuit assembly, and ultrasonically bonding wires to the first electronics mounting portion of the flexible circuit assembly bonded to the relatively rigid substrate.

17. A method of assembling an electronic package comprising the steps of taking a flexible circuit assembly having a first electronics mounting portion and a second portion extending therefrom, bonding the first portion of the flexible circuit assembly to a flat, relatively rigid substrate, leaving the second portion in a flexible condition, and soldering electronic components to the first portion of the flexible circuit assembly and to the second portion of the flexible circuit assembly.

* * * * *